US005530507A

United States Patent [19]
Boyd

[11] Patent Number: 5,530,507
[45] Date of Patent: Jun. 25, 1996

[54] METHOD OF ASSEMBLING ONE-TIME-USE CAMERA

[75] Inventor: James D. Boyd, Rochester, N.Y.

[73] Assignee: Eastman Kodak Company, Rochester, N.Y.

[21] Appl. No.: 403,088

[22] Filed: Mar. 13, 1995

[51] Int. Cl.⁶ .................................................. G03B 1/00
[52] U.S. Cl. ............................................ 354/212; 354/203
[58] Field of Search ................................... 354/212, 203

[56] References Cited

U.S. PATENT DOCUMENTS

| | | |
|---|---|---|
| 4,274,726 | 6/1981 | Yoneyama et al. . |
| 4,295,713 | 10/1981 | Edwards .................................. 352/235 |
| 4,303,325 | 12/1981 | Seely ........................................ 354/212 |
| 4,314,751 | 2/1982 | Harvey . |
| 4,600,285 | 7/1986 | Harvey . |
| 4,600,286 | 7/1986 | Harvey . |
| 4,914,462 | 4/1990 | Pagano .................................... 354/213 |
| 4,972,649 | 11/1990 | Mochida et al. .......................... 53/430 |
| 5,412,446 | 5/1995 | Rydelek . |

Primary Examiner—Monroe H. Hayes
Attorney, Agent, or Firm—Roger A. Fields

[57] ABSTRACT

A method of assembling a one-time-use camera comprising the steps of placing one of a longitudinal series of edge perforations in a film leader of a filmstrip to be exposed in the camera onto one of an annular series of peripheral teeth of a metering sprocket rotatably supported on a main body part of the camera in order to secure the film leader to the metering sprocket, and fitting a rear cover part of the camera to the main body part to make the camera light-tight, is characterized in that an edge perforation that is smaller than the others is forced onto the one tooth to prevent the film leader from becoming separated from the metering sprocket, before the rear cover part is fitted to the main body part.

3 Claims, 8 Drawing Sheets

FIG. 8

METHOD OF ASSEMBLING ONE-TIME-USE CAMERA

CROSS-REFERENCE TO RELATED APPLICATIONS

Reference is made to commonly assigned copending application Ser. No. 08/327,250, entitled COVER ASSEMBLY FOR CAMERA and filed Oct. 21, 1994 in the name of James D. Boyd, and Ser. No. 08/903,157 entitled METHOD OF ASSEMBLING ONE-TIME-USE CAMERA and filed Mar. 10, 1995 in the names of James D. Boyd and David B. Barclay.

The cross-referenced applications are incorporated in this application.

FIELD OF THE INVENTION

The invention relates generally to the field of photography, and in particular to a method of assembling a one-time-use camera.

BACKGROUND OF THE INVENTION

Film and cameras that are all in one, commonly referred to as single-use or one-time-use cameras, have recently become well known. Typically, the one-time-use camera is a simple point-and-shoot type comprising a plastic, inner, main body part which supports a fixed-focus taking lens, a film metering mechanism including a rotatably supported metering sprocket, a manual film advance thumbwheel, a single-blade shutter, a manual shutter release button, a frame counter for indicating the number of exposures remaining for picture-taking, a direct see-through viewfinder, and possibly an electronic flash unit. Plastic front and rear cover parts often house the main body part between them to complete the camera assembly, and the rear cover part connects to the main body part and/or to the front cover part to make the main body part light-tight. A decorative cardboard outer box contains the camera assembly and has respective openings for the taking lens, the shutter release button, the film advance thumbwheel, the viewfinder, the frame counter, and a flash emission window.

At the manufacturer, the main body part is loaded with a 12, 24, or 36 exposure 35 mm film cartridge, and the front and rear cover parts are connected to the main body part and/or to one another to complete the camera assembly and to make the main body part light-tight. Then, as disclosed in prior art U.S. Pat. No. 4,972,649, issued Nov. 27, 1990, an exposed end of a film take-up spool in the main body part is rotated to factory prewind substantially the entire length of the unexposed filmstrip from the cartridge shell onto the take-up spool. Lastly, the outer box is placed on the camera assembly.

After the photographer takes a picture with the one-time-use camera, he or she manually rotates the thumbwheel to rotate a cartridge spool inside the cartridge shell to rewind the exposed frame into the cartridge shell. The rewinding movement of the filmstrip the equivalent of slightly more than one frame width rotates the metering sprocket, which is in engagement with the filmstrip, to decrement the frame counter to its next lower-numbered setting. When the maximum number of exposures available on the filmstrip are exposed and the filmstrip is completely rewound into the cartridge shell, the one-time-use camera is given to a photofinisher who tears the outer box off the camera unit, separates the rear cover part from the main body part, and removes the film cartridge with the filmstrip from the main body part. Then, he removes the filmstrip from the cartridge shell to develop the negatives and make prints for the customer, and he forwards the used camera parts to the manufacturer for recycling, i.e. remanufacture.

Typically, during original manufacture or recycling of the one-time-use camera, the film cartridge including a film leader protruding from the cartridge shell and the film take-up spool to which a leading end of the protruding film leader is attached are placed in respective chambers in the main body part. The protruding film leader is positioned over the metering sprocket to place one of a longitudinal series of edge perforations in the leader onto one of an annular series of peripheral teeth on the metering sprocket in order to engage the leader to the metering sprocket. Then, the rear cover part is fitted to the main body part to prevent the protruding film leader from becoming separated from the metering sprocket. Because of the inherent curl of the protruding film leader, the leader may tend to spring away from the metering sprocket before the rear cover part is fitted to the main body part. If the rear cover is fitted to the main body part with the protruding film leader separated from the metering sprocket, the one-time-use camera cannot be operated to take pictures.

THE CROSS-REFERENCED APPLICATIONS

The two cross-referenced applications each disclose a method of assembling a one-time-use camera comprising the steps of placing one of a longitudinal series of edge perforations in a film leader of a filmstrip to be exposed in the camera onto one of an annular series of peripheral teeth of a metering sprocket rotatably supported on a main body part of the camera, and fitting a rear cover part of the camera to the main body part to make the camera light-tight. First, the rear cover part is fitted initially to the main body part with some separation between the two to allow access to inside the camera at successive assembly stations, and with a center portion of the rear cover part flexed toward the one tooth to prevent the one perforation from slipping off the one tooth during movement of the camera to the assembly stations. Then, the rear cover part is fitted finally to the main body part with no separation between the two to make the main body part light-tight, and with the center portion of the rear cover part straightened to retract from the one tooth. Although the film leader is secured to the metering sprocket, it may become loose.

SUMMARY OF THE INVENTION

According to one aspect of the invention a method of assembling a one-time-use camera comprising the steps of placing one of a longitudinal series of edge perforations in a film leader of a filmstrip to be exposed in the camera onto one of an annular series of peripheral teeth of a metering sprocket rotatably supported on a main body part of the camera in order to secure the film leader to the metering sprocket, and fitting a rear cover part of the camera to the main body part to make the camera light-tight, is characterized in that:

an edge perforation that is smaller than the others is forced onto the one tooth to prevent the film leader from becoming separated from the metering sprocket, before the rear cover part is fitted to the main body part.

According to another aspect of the invention a one-time-use camera comprising a main body part, a metering sprocket rotatably supported on the main body part and having an annular series of peripheral teeth, a filmstrip to be exposed in the camera and having a film leader provided with a longitudinal series of edge perforations one of which is to be placed onto one of the teeth in order to secure the film leader to the metering sprocket, and a rear cover part to be fitted to the main body part to make the camera light-tight, is characterized in that:

the film leader has an edge perforation that is smaller than the others to be forced onto the one tooth to prevent the film leader from becoming separated from the metering sprocket, before the rear cover part is fitted to the main body part.

DETAILED DESCRIPTION OF THE INVENTION

The invention is disclosed as being embodied preferably in a one-time-use camera. Because the features of a one-time-use camera are generally known as shown for example in prior art U.S. Pat. No. 4,972,649, issued Nov. 27, 1990, the description which follows is directed in particular only to those elements forming part of or cooperating directly with the disclosed embodiment. It is to be understood, however, that other elements may take various forms known to a person of ordinary skill in the art.

Figure 1:
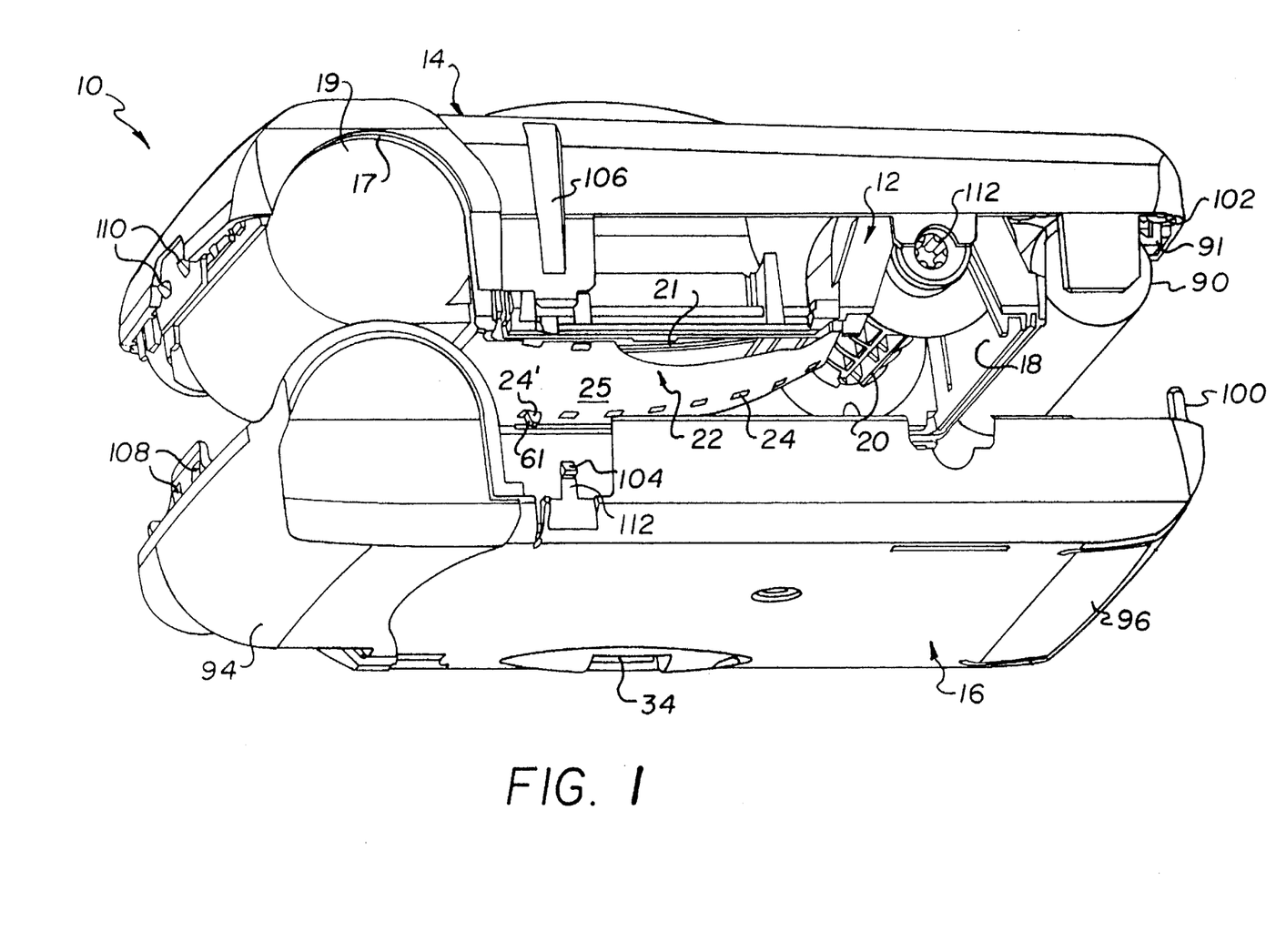
FIGS. 1, 2, and 3 are bottom rear perspective views of a one-time-use camera, showing successive steps of assembling the camera according to a preferred embodiment of the invention.
Figure 3:
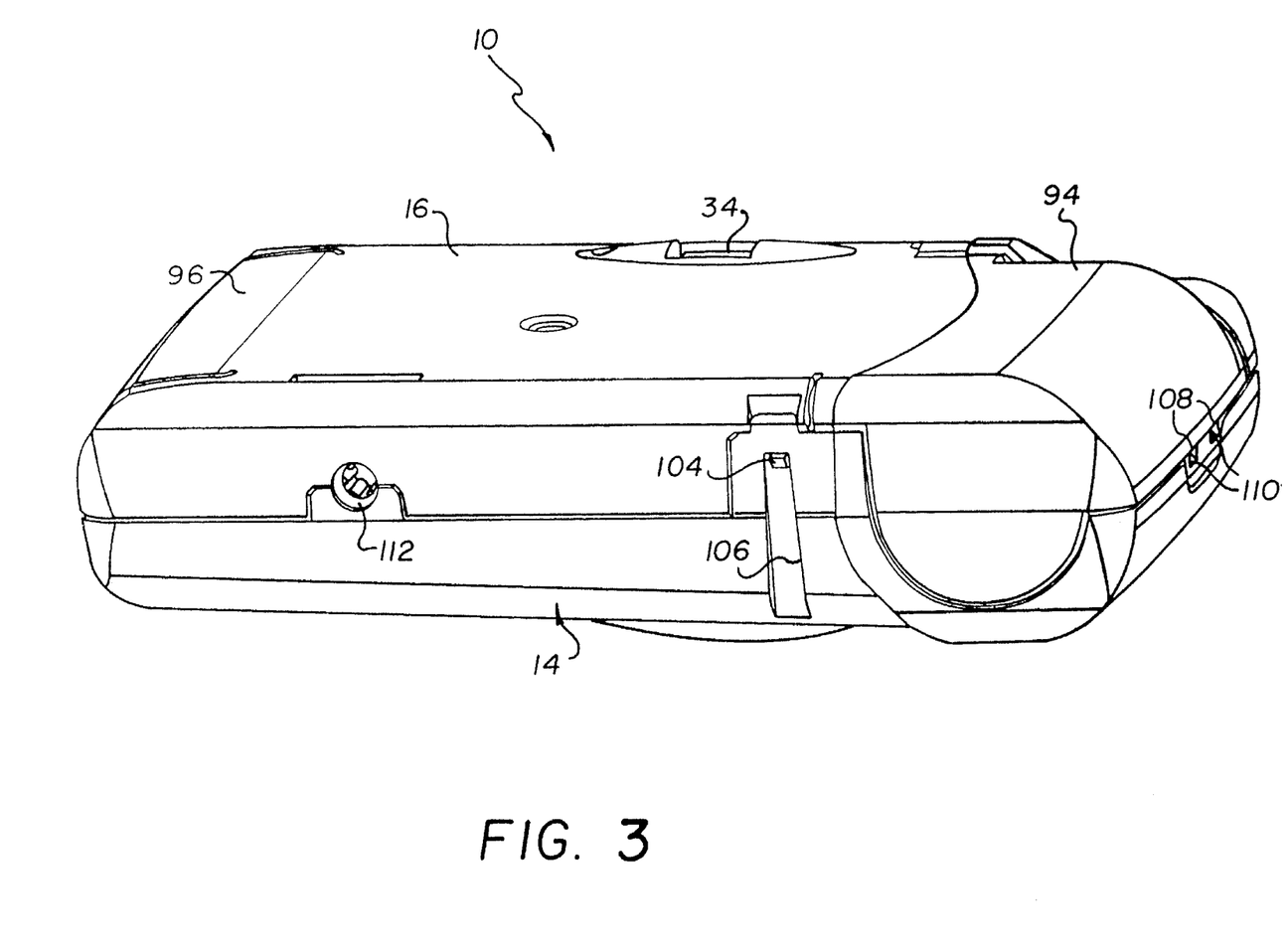
Figure 6:
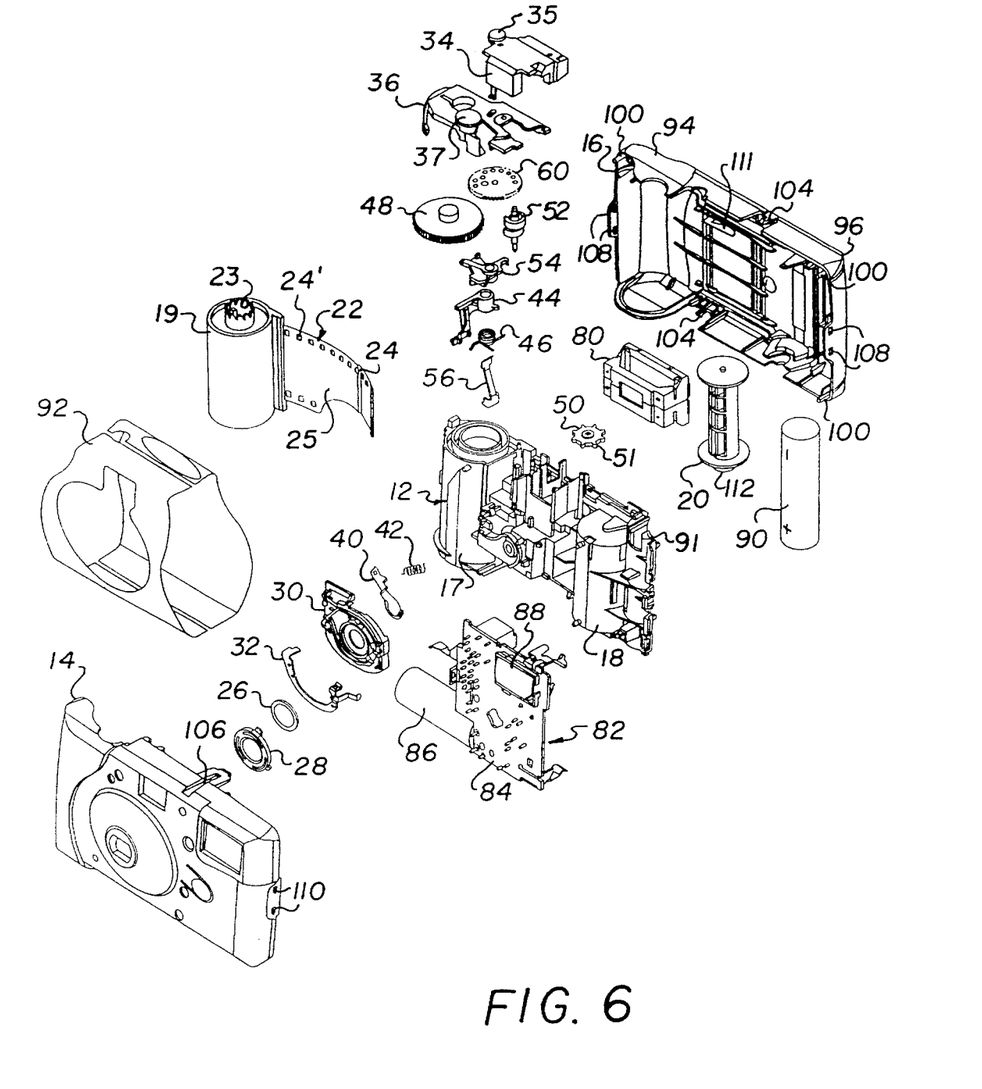
FIG. 6 is an exploded front perspective view of the camera.
Figure 7:
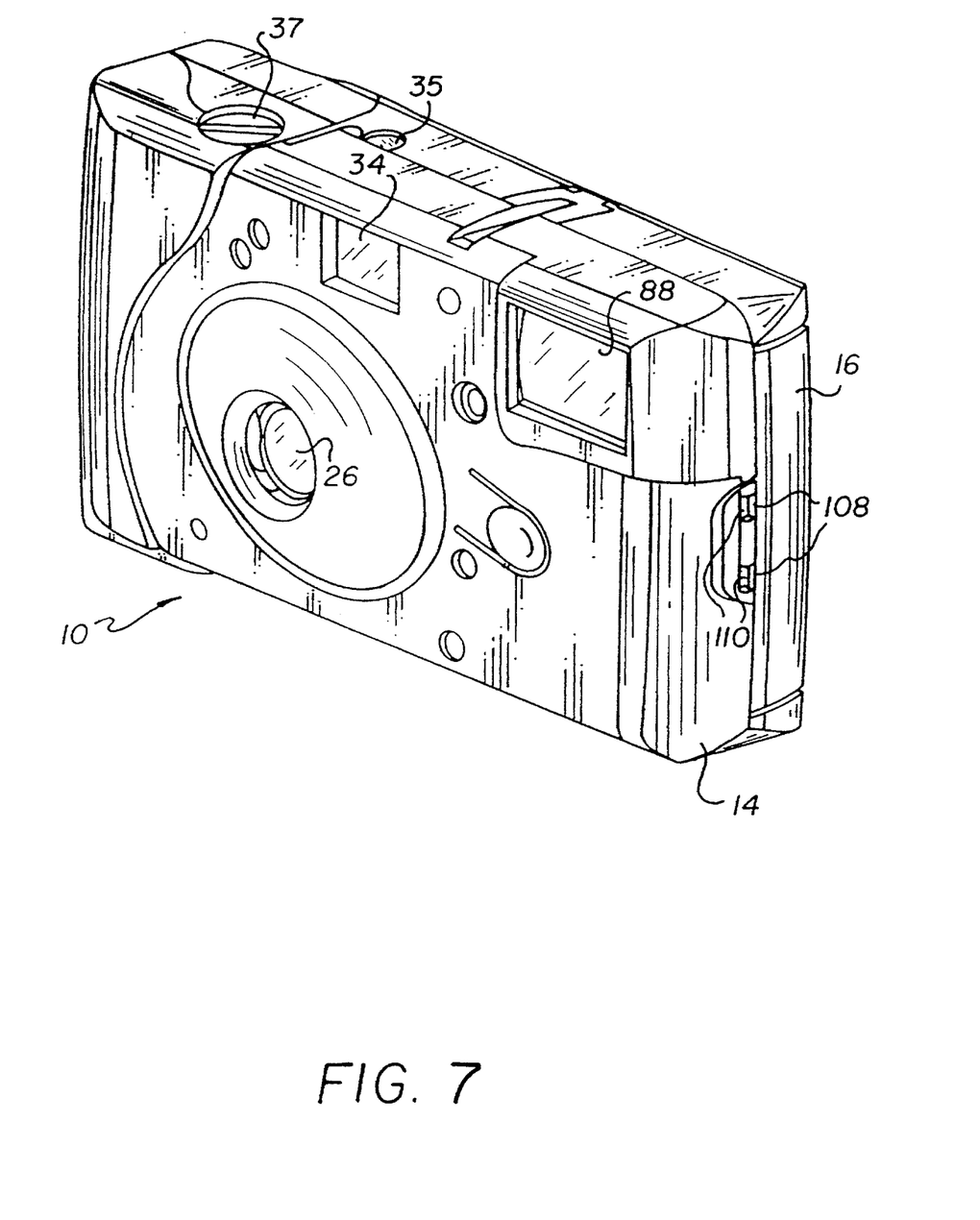
FIG. 7 is an assembled front perspective view of the camera.

Referring now to the drawings, FIGS. 6 and 7 depict a one-time-use or single-use camera 10 having a plastic main body part 12, and a pair of plastic front and rear cover parts 14 and 16 which connect to one another to house the main body part between them in order to complete the camera assembly. The main body part 12 is adapted to be nested in the front cover part 14 as shown in FIG. 1, and the rear cover part 16 is intended to be fitted to the main body part 12 to make the main body part light-tight as shown in FIG. 3.

As shown in FIG. 6, the main body part 12 has integral cartridge-receiving and film roll chambers 17 and 18 for a light-tight film cartridge 19 and a film take-up spool 20. The chambers 17 and 18 are located at opposite sides of a backframe or film exposure opening 21, shown in FIG. 1, at which successive frames of a filmstrip 22 are exposed during picture-taking. The filmstrip 22 is normally stored in a roll form on a cartridge spool 23 rotatably supported inside the film cartridge 19, and has a longitudinal series of edge perforations 24 included along a film leader 25 which protrudes from the film cartridge as shown in FIG. 6.

Figure 2:
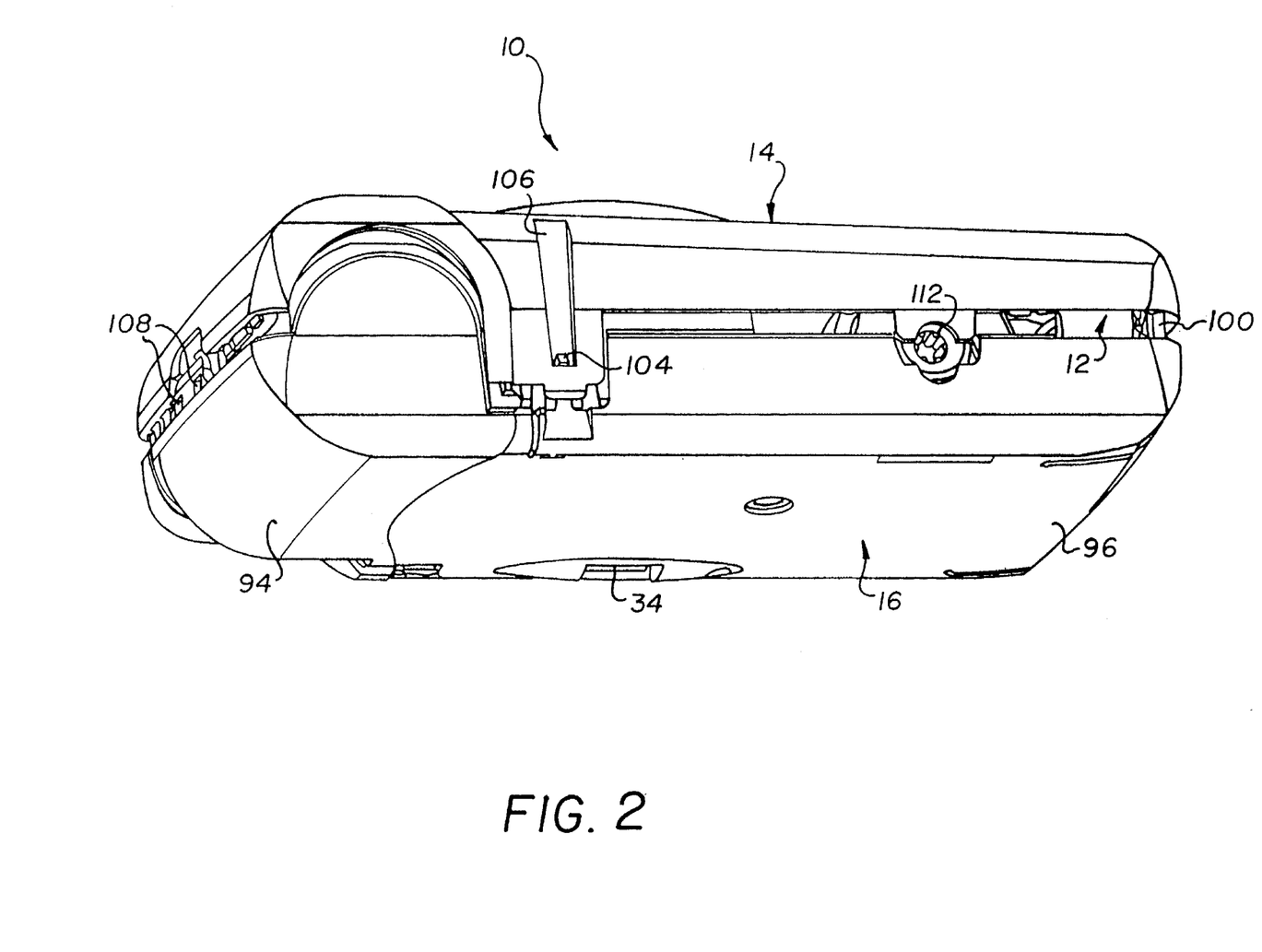

The main body part 12 supports various camera elements which are attached to the main body part before it is nested in the front cover part 14 and the front and rear cover parts 14 and 16 are connected to one another to house the main body part between them. These camera elements are a fixed-focus taking lens 26 which is sandwiched between a snap-on lens retainer 28 and a lens support plate 30, connected to the main body part at its front; a shutter-flash synchronization switch contact 32 attached to the lens support plate 30; a pair of front and rear viewfinder lenses 34 (only the front viewfinder lens is shown in FIG. 2) and an integral frame magnifier 35, connected to the main body part at its top; a shutter mechanism comprising a keeper plate 36 having an integral manually depressable shutter release button 37 for releasing a pivotally mounted shutter blade 40, a shutter return spring 42, a high-energy lever 44 for actuating the shutter blade to pivot the blade open in order to uncover the taking lens to make a film exposure, and a lever actuating spring 46; a film advancing and metering mechanism comprising a manually rotatable film advance thumbwheel 48 for engaging the cartridge spool 23 to rotate the spool in order to wind an exposed frame of the filmstrip 22 into the film cartridge 19 after each film exposure, a film metering sprocket 50 having an annular array of peripheral teeth 51 for successively engaging the respective perforations 24 in the filmstrip, and a cooperating metering cam 52, metering lever 54 and metering spring 56 which operate in a known manner with a frame counter 60 (made readable via the frame magnifier 37), the film advance thumbwheel 48, and the metering sprocket 50 to decrement the frame counter to its next lower-numbered setting and to lock the thumbwheel (until the shutter release button 37 is depressed) after the thumbwheel is rotated to wind an exposed frame into the film cartridge 19; a light baffle 80 which forms the back-frame opening 21; and an electronic flash illumination assembly 82 comprising a circuit board 84, a capacitor 86, a flash emission lens 88, and a battery 90. The battery is held in a battery-receiving chamber 91 in the main body part 12. A pair of front and rear decorative labels 92 cover central portions of the front and rear cover parts 14 and 16 after the front and rear cover parts are connected to one another to house the main body part 12 between them.

Figure 4:
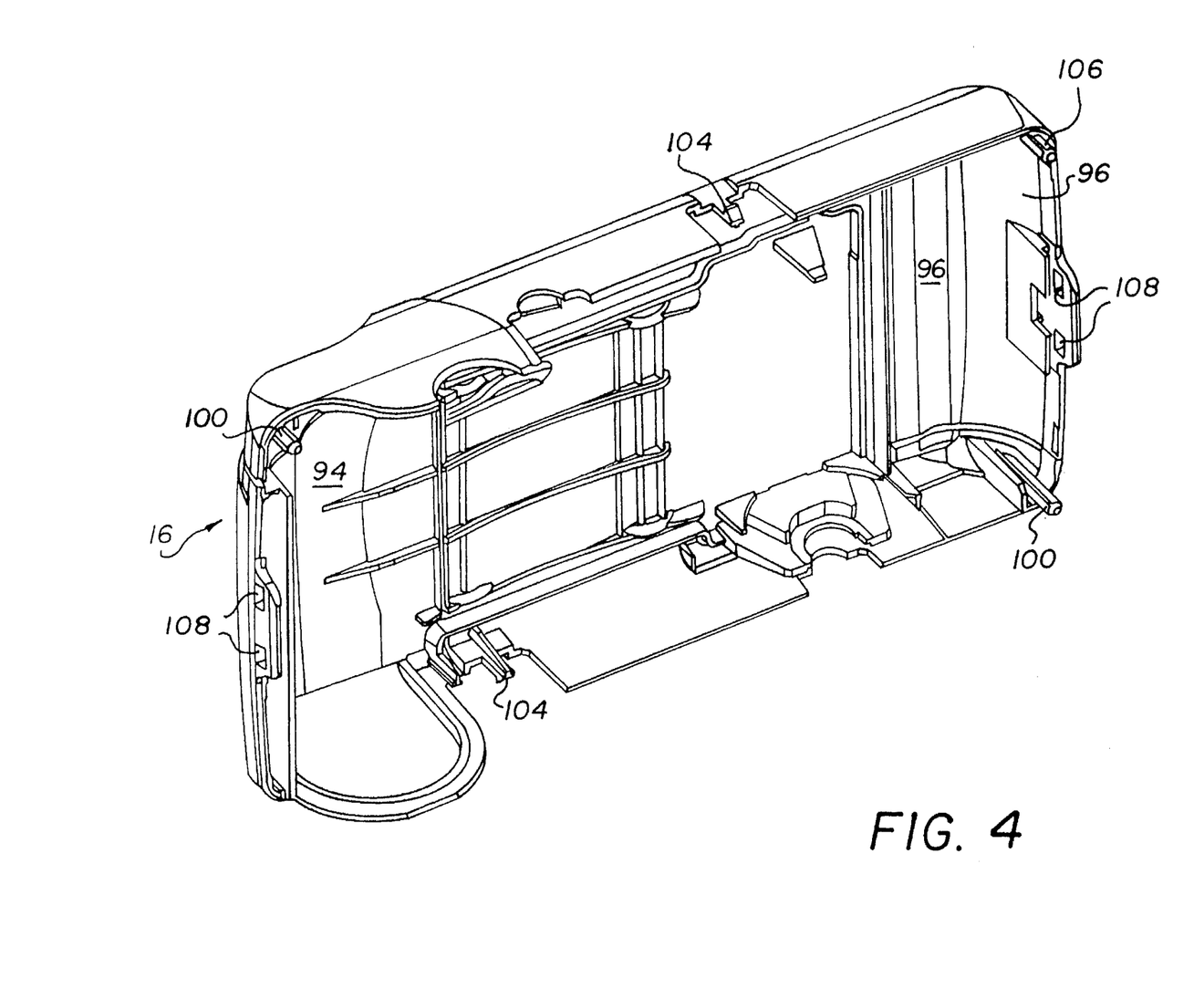
FIG. 4 is a bottom perspective view of a rear cover part of the camera as seen from an inner side of the rear cover part.
Figure 8:
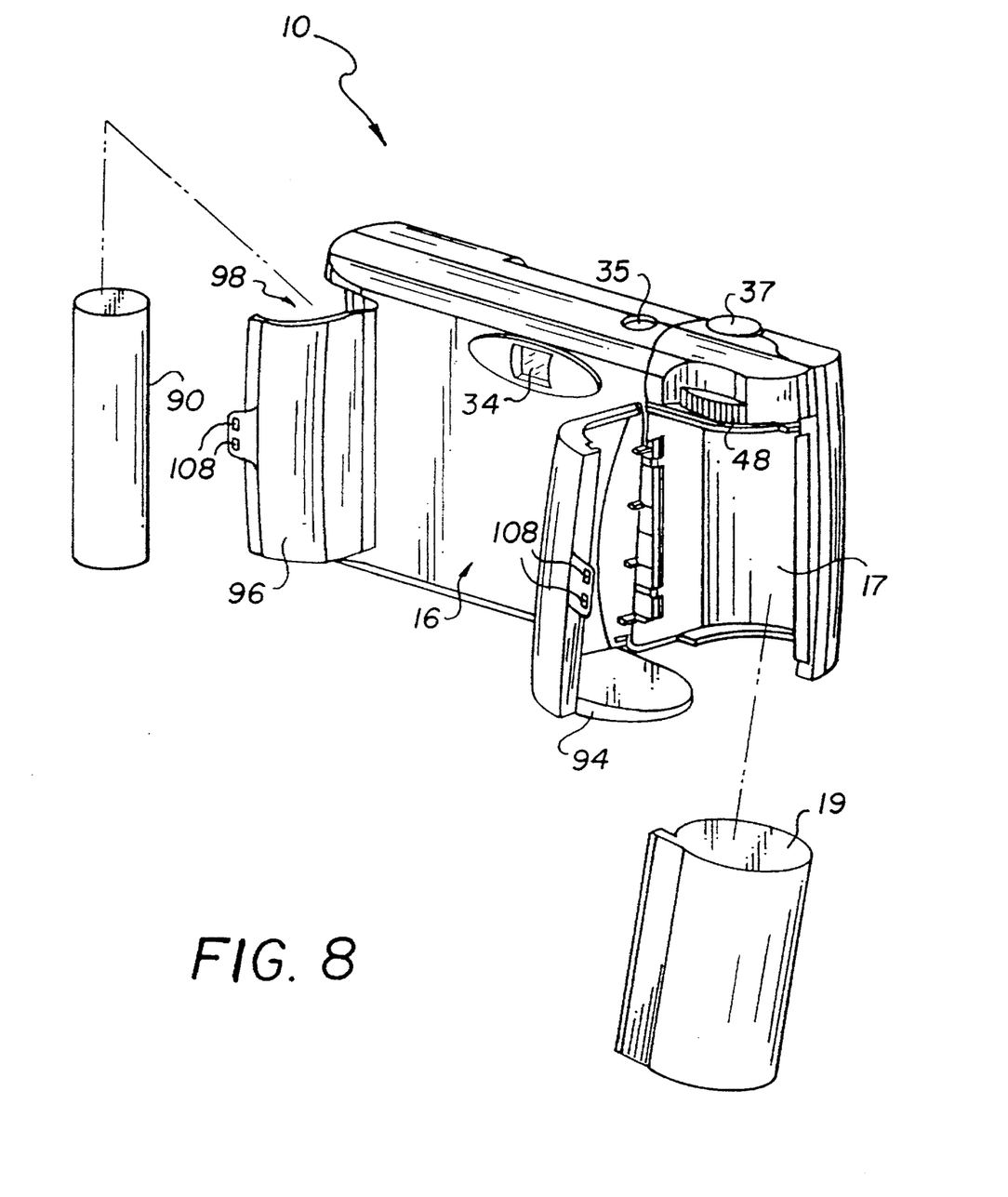
FIG. 8 is an assembled rear perspective view of the camera, showing a pair of rear cover doors of the rear cover part opened to remove a battery and a film cartridge from respective chambers.

As shown in FIGS. 4, 6, and 8, a breakaway cartridge-cover door 94 and a breakaway battery-cover door 96 are provided on the rear cover part 16, opposite the cartridge-receiving chamber 17 and the battery-receiving chamber 91. The two cover doors 94 and 96 can be pivoted open along respective hinge grooves along the inside of the rear cover part 16 to remove the film cartridge 19 and the battery 90 from the chambers 17 and 91.

Figure 5:
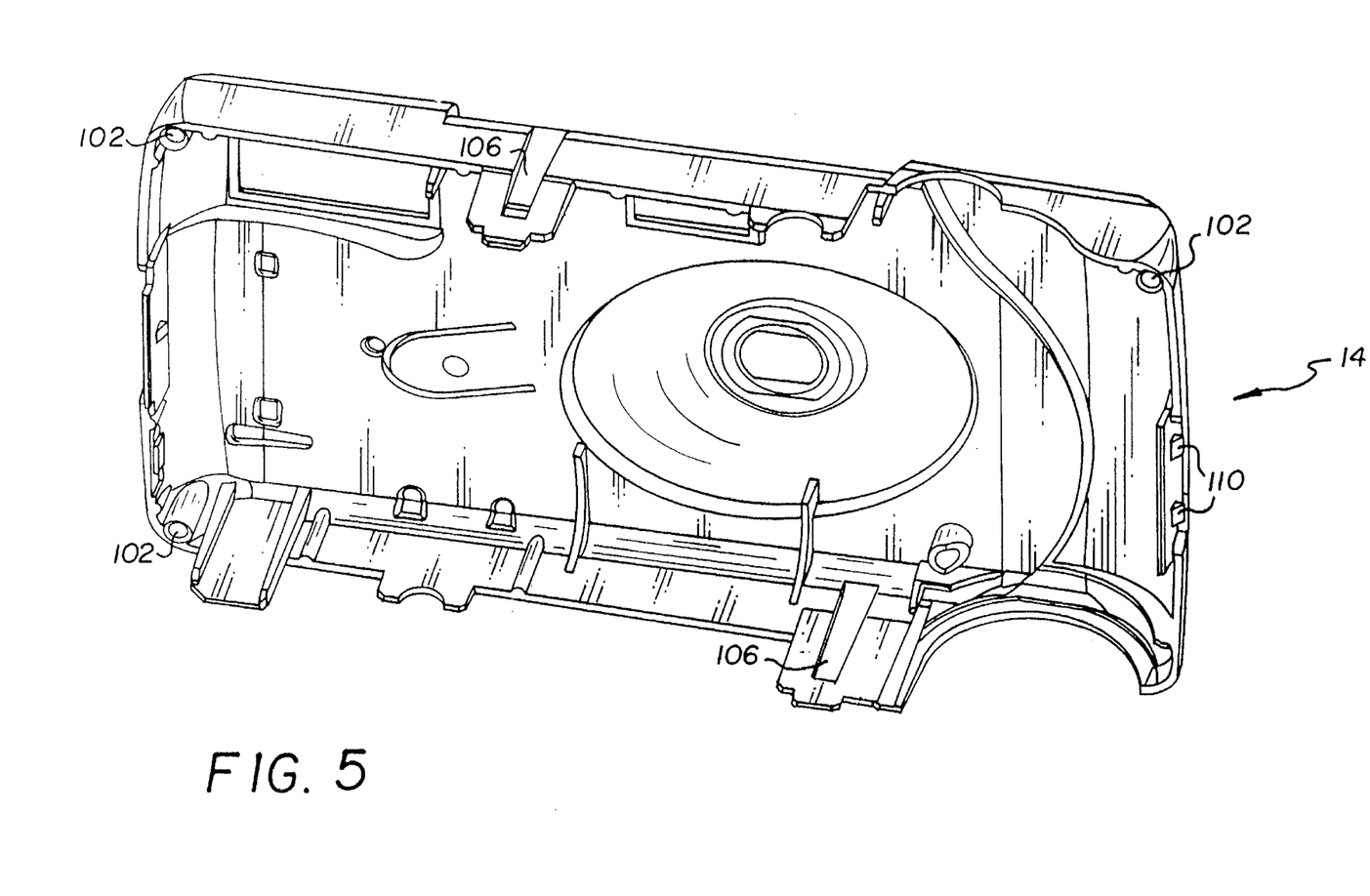
FIG. 5 is a bottom perspective view of a front cover part of the camera as seen from an inner side of the front cover part.

The rear cover part 16 has three identical corner pins 100 intended to be easily received only slightly in respective corner pin-holes 102 in the front cover part 14 when the main body part 12 is nested in the front cover part and the front and rear cover parts are relatively arranged in an intermediate assembly position shown in FIG. 2. At the same time an identical pair of top and bottom center hooks 104 on the rear cover part 16 are locally forced into respective top and bottom center slots 106 in the front cover part 14 to prevent the front and rear cover parts from becoming separated as in FIG. 1. See FIGS. 4 and 5. Since the three corner pins 100 cannot be inserted further into the three corner pin-holes 102 without some force, and the top and bottom center hooks are engaged with the front cover part 14 at the two center slots 106, a center portion of the rear cover part 16 will be slightly bowed or flexed inwardly toward the metering sprocket 50 and there is some separation between the rear cover part and the main body part 12.

The cartridge-cover door 94 and the battery-cover door 96 each have an identical pair of end holes 108 adapted to mate with respective pairs of hooks 110 at opposite ends of the front cover part 16 to connect the front and rear cover parts 14 and 16 to one another when the main body part 12 is nested in the front cover part and the front and rear cover parts are relatively arranged in a final assembly position shown in FIGS. 3 and 7. At the same time the three corner pins 100 are machine press-forced further into the three corner pin-holes 102 to discontinue the inward bowing of the center portion of the rear cover part 16, allowing the rear cover part to inherently straighten. Thus, the rear cover part 16 is fitted to the main body part 12 to make the main body part light-tight.

ASSEMBLY OF THE ONE-TIME-USE CAMERA

Initially, the film cartridge 19 with the protruding film leader 25 and the film take-up spool 20 to which a leading end of the leader is attached are placed in the cartridge-receiving and film roll chambers 17 and 18 in the main body part 12. At least one of the film perforations 24' in the protruding film leader 25 is smaller than the other perforations 24 in the filmstrip 22. The smaller perforation 24' is manually forced onto one of the peripheral teeth 51 of the metering sprocket 50 to firmly hold the protruding film leader 25 in place and to prevent the leader from becoming disengaged from the metering sprocket. Then the main body part 12 is nested in the front cover part 14. See FIG. 1. If one of the larger perforations 24 was placed on one of the peripheral teeth 51, the protruding film leader 25 might spring out of engagement with the metering sprocket because of the inherent curl of the leader.

Next, the rear cover part 16 and the front cover part 14 are arranged in the intermediate assembly position shown in FIG. 2, with the three corner pins 100 of the rear cover part received only slightly in the three corner pin-holes 102 in the front cover part 14 and the top and bottom center hooks 104 of the rear cover part locally forced into the top and bottom center slots 106 in the front cover part 14. At this time there is some separation between the rear cover part 16 and the main body part 12 due to the extension of the three corner pins 100 from the three corner pin-holes 102, and the center portion of the rear cover part is slightly bowed or flexed inwardly toward the metering sprocket 50 due to the engagement of the top and bottom center hooks 104 with the front cover part 14 at the top and bottom center slots 106 and the extension of the three corner pins from the three corner pin-holes. The separation allows access to inside the main body part 12 at successive assembly stations, and inward bowing of the center portion further serves (in addition to engagement of the smaller perforation 24' and the one tooth 51) to prevent the film leader 25 from becoming disengaged from the metering sprocket 50 during movement of the camera assembly to the assembly stations. The rear cover part 16 has a clearance cavity 111, shown in FIG. 4, for providing a space for the metering sprocket 50.

Next, the rear cover part 16 and the front cover part 14 are arranged in the final assembly position shown in FIG. 3 and 7, with the two pairs of hooks 110 at opposite ends of the front cover part locally forced into the two pairs of end holes 108 in the cartridge-cover door 94 and the battery-cover door 96 and the three corner pins 100 machine press-forced further into the three corner pin-holes 102, to discontinue the separation between the rear cover part and the main body part 12 and to discontinue inward bowing of the center portion of the rear cover part 14. Thus, the rear cover part 16 will inherently straighten and be fitted to the main body part 12 to make the main body part light-tight.

Next, a rotational device such as a powered screwdriver is engaged with an exposed end 112 of the film take-up spool 20 to rotate the spool to factory prewind substantially the entire length of the filmstrip 22 from the film cartridge 19 onto the spool.

Lastly, the decorative labels 92 are placed on the front and rear cover parts 14 and 16.

The invention has been described with reference to a preferred embodiment. However, it will be appreciated that variations and modifications can be effected by a person of ordinary skill in the art without departing from the scope of the invention.

PARTS LIST 10 one-time-use camera
12 main body part
14 front cover part
16 rear cover part
17 cartridge-receiving chamber
18 film roll chamber
19 film cartridge
20 film take-up spool
21 backframe opening
22 filmstrip
23 cartridge spool
24 edge perforations
24' smaller perforation
25 film leader
26 taking lens
28 lens retainer
30 lens support plate
32 shutter-flash synchronization switch contact
34 front and rear viewfinder lenses
35 frame magnifier
36 keeper plate
37 shutter release button
40 shutter blade
42 shutter return spring
44 high-energy lever
46 lever actuating spring
48 film advance thumbwheel
50 film metering sprocket
51 peripheral teeth
52 metering cam
54 metering lever
56 metering spring
60 frame counter
80 light baffle
82 electronic flash illumination assembly
84 circuit board
86 capacitor
88 flash emission lens
90 battery
91 battery-receiving chamber
92 front and rear labels
94 cartridge-cover door
96 battery-cover door
100 three corner guide pins
102 three corner pin-holes
104 top and bottom center hooks
106 top and bottom center slots
108 two pairs of end holes
110 two pairs of end hooks
111 clearance cavity 112 exposed spool end

I claim:

1. A method of assembling a one-time-use camera comprising the steps of placing one of a longitudinal series of edge perforations in a film leader of a filmstrip to be exposed in the camera onto one of an annular series of peripheral teeth of a metering sprocket rotatably supported on a main body part of the camera in order to secure the film leader to the metering sprocket, and fitting a rear cover part of the camera to the main body part to make the camera light-tight, is characterized in that:

an edge perforation that is smaller than the others is forced onto the one tooth to prevent the film leader from becoming separated from the metering sprocket, before the rear cover part is fitted to the main body part.

2. A method as recited in claim 1, wherein a film cartridge with the film leader protruding from the cartridge and a spool to which a leading end of the leader is attached are placed in respective chambers in the main body part, and the film leader is positioned over the metering sprocket to be able to force the smaller perforation onto the one tooth.

3. A one-time-use camera comprising a main body part, a metering sprocket rotatably supported on said main body part and having an annular series of peripheral teeth, a filmstrip to be exposed in said camera and having a film leader provided with a longitudinal series of edge perforations one of which is to be placed onto one of said teeth in order to secure said film leader to said metering sprocket, and a rear cover part to be fitted to said main body part to make said camera light-tight, is characterized in that:

said film leader has an edge perforation that is smaller than the others to be forced onto said one tooth to prevent said film leader from becoming separated from said metering sprocket, before said rear cover part is fitted to said main body part.

* * * * *